US009940344B2

(12) United States Patent
Fusco et al.

(10) Patent No.: US 9,940,344 B2
(45) Date of Patent: Apr. 10, 2018

(54) FRACTAL APPROACH FOR PROBABILISTIC FLOW CACHE MAINTENANCE

(71) Applicant: Red Hat, Inc., Raleigh, NC (US)

(72) Inventors: Francesco Fusco, Zurich (CH); Daniel Borkmann, Udorf (CH); Thomas Graf, Fehraltorf (CH)

(73) Assignee: Red Hat, Inc., Raleigh, NC (US)

( * ) Notice: Subject to any disclaimer, the term of this patent is extended or adjusted under 35 U.S.C. 154(b) by 775 days.

(21) Appl. No.: 14/188,903

(22) Filed: Feb. 25, 2014

(65) Prior Publication Data
US 2015/0169569 A1 Jun. 18, 2015

Related U.S. Application Data

(60) Provisional application No. 61/917,551, filed on Dec. 18, 2013.

(51) Int. Cl.
*G06F 17/30* (2006.01)

(52) U.S. Cl.
CPC .............................. *G06F 17/3033* (2013.01)

(58) Field of Classification Search
CPC .................................................. G06F 17/3033
USPC ........................................................ 707/698
See application file for complete search history.

(56) References Cited

U.S. PATENT DOCUMENTS

| 6,516,320 | B1 * | 2/2003 | Odom | G06F 17/30955 707/747 |
| 6,668,310 | B2 * | 12/2003 | McKenney | G06F 11/3466 711/144 |
| 7,215,672 | B2 * | 5/2007 | Reshef | H04L 12/5602 370/395.1 |
| 7,304,942 | B1 * | 12/2007 | Malladi | H04L 47/215 370/229 |
| 7,369,557 | B1 * | 5/2008 | Sinha | H04L 45/38 370/392 |
| 7,464,103 | B2 * | 12/2008 | Siu | G06F 21/10 |
| 7,630,309 | B1 * | 12/2009 | Lim | G06F 5/06 370/230.1 |
| 8,140,761 | B2 * | 3/2012 | Ekanadham | G06F 11/348 702/127 |
| 8,688,914 | B2 * | 4/2014 | Benhase | G06F 12/0871 711/118 |

(Continued)

OTHER PUBLICATIONS

Tarkoma, et al. Theory and Practice of Bloom Filters for Distributed Systems IEEE Communications Society, Apr. 15, 2011.

(Continued)

*Primary Examiner* — Miranda Le
(74) *Attorney, Agent, or Firm* — Womble Bond Dickinson (US) LLP; Daniel Ovanezian

(57) ABSTRACT

An apparatus sets a layer counter to point to a first layer of a data structure. The apparatus determines the layer counter to reference an overflowing cell. The apparatus increments the layer counter to point to a second layer of the data structure. The apparatus determines the incremented layer counter to reference a non-overflowing cell. The apparatus increments a value of the non-overflowing cell, wherein the first layer is stored in a first cache and the second layer is stored in a second cache, and wherein the first cache differs from the second cache with respect to one or more of speed or size.

12 Claims, 8 Drawing Sheets

(56) References Cited

U.S. PATENT DOCUMENTS

| | | | |
|---|---|---|---|
| 8,732,139 B2* | 5/2014 | Schreter | G06F 17/30327 |
| | | | 707/696 |
| 2008/0256094 A1* | 10/2008 | Gupta | G06F 17/30949 |
| 2014/0089612 A1* | 3/2014 | Feldhofer | H03K 21/403 |
| | | | 711/156 |

OTHER PUBLICATIONS

S. Geravand, M. Ahmadi, "Bloom Filter Applications in Network Security: A State-of-the-Art Survey", Computer Networks (2013), doi: http://dx.doi.org/10.1016/j.comnet.2013.09.003, Sep. 13, 2012.
Fan et al. "The Cuckoo Filter: It's Better Than Bloom", Carnegie Mellon University, Intel Labs, Aug. 2013.
Fan et al. "Summary Cache: A Scalable Wide-Area Web Cache Sharing Protocol", IEEE/ACM Transactions on Networking, vol. 8, No. 3, Jun. 2000.
Frigo et al. "Cache-oblivious algorithms". In Proceedings of the 40th IEEE Symposium on Foundations of Computer Science (FOCS 99), p. 285-297, Oct. 17-18, 1999.
Broder et al., "Network applications of Bloom filters: A survey", Internet Math 1 (2004), 485-509.
Rothenberg et al., "In-packet Bloom filters: Design and networking applications", Computer Networks 55(6):1364-1378 (2011).
Bonomi et al. "An Improved Construction for Counting Bloom Filters", 14th Annual European Symposium on Algorithms, LNCS 4168, Sep. 2006.
Kasheff, Zardosht, Tokutek.com "TokuMX Fractal Tree(R) indexes, what are they?", Jul. 2, 2013; retrieved from http://www.tokutek.com/2013/07/tokumx-fractal-treer-indexes-what-are-they/.

* cited by examiner

| 301 | 303 | 305 |
|---|---|---|
| 0 | 0 | 0 |

Fig. 3A

| 301 | 303 | 305 |
|---|---|---|
| 1 | 0 | 0 |

Fig. 3B

| 301 | 303 | 305 |
|---|---|---|
| 1 | 1 | 0 |

Fig. 3C

| 301 | 303 | 305 |
|---|---|---|
| 1 | 2 | 0 |

| 501 | 503 | 505 |
|---|---|---|
| 1 | 0 | 0 |

Fig. 5B

| 501 | 503 | 505 |
|---|---|---|
| 0 | 0 | 0 |

Fig. 6A

| 601 | 603 | 605 |
|---|---|---|
| 1 | 2 | 0 |

Fig. 6B

| 601 | 603 | 605 |
|---|---|---|
| 1 | 1 | 0 |

| | Fig. 7A | Fig. 7B | Fig. 7C | Fig. 7D | Fig. 7E |
|---|---|---|---|---|---|
| | 0 0 0 | 1 0 0 | 1 0 0 | 1 0 0 | 1 0 0 |
| | 0 0 0 | 0 0 0 | 1 0 0 | 1 0 0 | 0 0 0 |
| | 0 0 0 | 0 0 0 | 0 0 0 | 0 0 0 | 0 0 0 |
| | 0 0 0 | 1 0 0 | 1 1 0 | 1 2 0 | 1 1 0 |
| | 0 0 0 | 0 0 0 | 0 0 0 | 0 0 0 | 0 0 0 |
| | 0 0 0 | 0 0 0 | 1 0 0 | 1 0 0 | 0 0 0 |
| | 0 0 0 | 1 0 0 | 1 0 0 | 1 1 0 | 1 1 0 |
| | 0 0 0 | 0 0 0 | 0 0 0 | 1 0 0 | 1 0 0 |
| | 701 703 705 | 701 703 705 | 701 703 705 | 701 703 705 | 701 703 705 |

US 9,940,344 B2

FRACTAL APPROACH FOR PROBABILISTIC FLOW CACHE MAINTENANCE

CROSS-REFERENCE TO RELATED APPLICATION

This application claims the benefit of U.S. Provisional Application No. 61/917,551 filed Dec. 18, 2013, which is incorporated herein by reference in its entirety.

TECHNICAL FIELD

This disclosure relates to the field of sets, and in particular, to filters employable in set membership queries.

BACKGROUND

Filters may be employed with respect to sets. Insertion into a filter can be performed with respect to in-set entities. If it is subsequently desired to know whether or not an entity is a member of the set, a lookup can be performed with respect to the filter.

Certain filters allow for removal to be performed with respect to entities which cease to be in-set. However, filters which offer such ability tend demand that onerous sacrifices be made in return for this removal ability.

BRIEF DESCRIPTION OF THE DRAWINGS

The present disclosure is illustrated by way of example, and not by way of limitation, in the figures of the accompanying drawings.

FIGS. 3A-3D illustrate the performance of incrementing the count of an item, according to an example.

FIGS. 5A and 5B illustrate the performance of decrementing the count of an item, according to an example.

FIGS. 6A and 6B illustrate the performance of decrementing the count of an item, according to another example.

FIGS. 7A-7E illustrate the performance of maintaining, with respect to each of multiple items, count of that item, according to an example.

DETAILED DESCRIPTION

Filters may be employed with respect to sets. For instance, filters are employable with respect to firewalls where it may be desired to know whether or not an incoming flow has been seen before and/or whether it matches a set of filtering rules. In-set entities can be inserted into the filter, and later set membership queries can be performed.

The ability to perform removal with respect to a filter is often desirable. For instance, removal might be performed with respect to an entity which had been in a set but then is removed from the set. Returning to the example of firewalls, removal might be desirable with respect to expired flows.

However, filters that allow for such removal tend to require that certain sacrifices be made, such as that large, slow, and/or expensive memory be provided for the filter's use.

Set forth herein are examples of approaches by which a filter can provide desirable features—including but not limited to allowing for removal operations to be performed—while requesting meager resources in return.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely examples. Particular implementations may vary from these example-only details and still be contemplated to be within the scope of the present invention.

Figure 1:
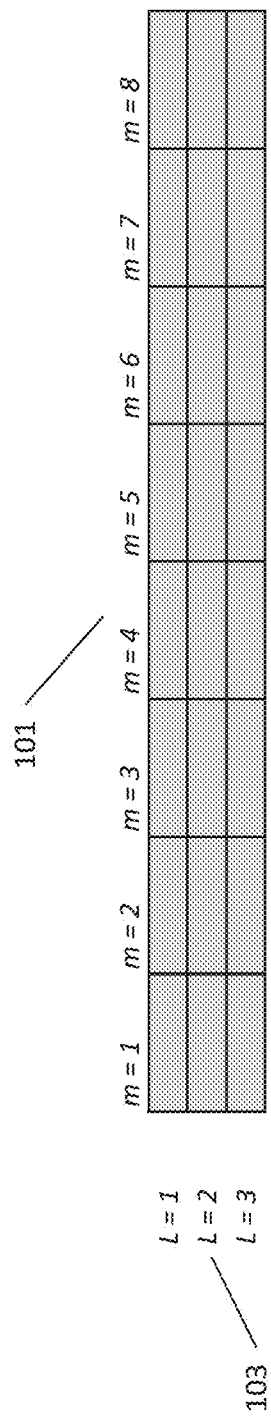
FIG. 1 illustrates an example data structure in which examples of the present invention may operate.

Shown in FIG. 1 is an example data structure employable in connection with example functionality discussed herein. The data structure is made up of cells arranged into m columns 101 and L layers 103. To facilitate discussion, for the example of FIG. 1 the data structure is shown with m=8 and therefore eight columns of cells, and with L=3 and therefore three layers of cells. To further facilitate discussion, the value of L will be considered to increase as one progresses from the top of the data structure to the bottom of the data structure. As such, the top layer of the data structure of FIG. 1 corresponds to L=1, the middle layer of the data structure of FIG. 1 corresponds to L=2, and the bottom layer of the data structure of FIG. 1 corresponds to L=3. An alternate numbering scheme might be employed (e.g., the value of L might decrease as one progresses from the top of the data structure to the bottom of the data structure).

According to an example, each cell holds a certain quantity of bits (e.g., mappable to an integer). Each of the cells of a given row may each possess the same number of bits. Moreover, the quantity of bits employed per cell may increase as one progresses from upper layers of the data structure to lower layers of the data structure. As such, bearing in mind the discussed L numbering scheme of the example of FIG. 1, the quantity of bits employed per cell may increase as one progresses from layer L=1 to layer L=3. Such increase in the number of bits per cell may proceed in a stepwise fashion. For instance, the number of bits employed for the cells of a row may double as one proceeds to lower layers. The number of bits employed for the first layer might be set during a configuration operation. For example, the first row may be made up of one-bit cells.

As such, taking the example of FIG. 1 to have one-bit cells in its first layer, and the number of bits per cell to double as one proceeds from a given row to the subsequent lower row, the cells of layer L=1 would be one bit cells, the cells of layer L=2 would be two bit cells, and the cells of layer L=3 would be four bit cells. Moreover, taking the cells of the data structure of FIG. 1 to be mappable to integers, the cells of layer L=1 could each hold a value ranging from integer 0 to integer 1 (binary 0 to binary 1), the cells of layer L=2 could each hold a value ranging from integer 0 to integer 3 (binary 00 to binary 11), and the cells of layer L=3 could each hold a value ranging from integer 0 to integer 31 (binary 0000 to binary 1111). The top end of such a range—for instance integer 3 (binary 11) in the case of two bits—might be viewed as a the overflow value for the corresponding cell (e.g., from the vantage point that no further increment is possible).

As another example, there might not be such a stepwise progression in the number of bits per cell as one progresses layer-wise. For instance, the number of bits employed per cell might be set on a per-row basis during a confutation operation. For instance, a first layer might be set to have one bit cells, a second layer might be set to have 3 bit cells, and a third layer might be set to have 8 bit cells.

The cells of each of one or more given columns of the data structure might be interpreted as summing to a value. For instance, with an eye towards FIG. 1 it is noted that the column m=1 cell of layer L=1, the column m=1 cell of layer L=2, and the column m=1 cell of layer L=3 might be interpreted as summing to a value. Likewise might hold with respect to the other data structure columns, column m=2 through column m=8. As such, the data structure might be employable in maintaining counts of items. For instance, each column of the data structure might be tasked with keeping count of a particular item. As is discussed in greater detail hereinbelow (e.g., in connection with FIGS. 7A-7E and FIG. 8), as an example such an item might be the occurrence of one or more hash functions (e.g., SHA1, SHA256, MD5, and/or CRC32) yielding a value of 1 with respect to a particular bit position.

As an illustration, suppose that an application of three hash functions could yield, among eight bit positions, up to three occurrences of a value of 1 with respect to a particular bit position. Taking an item to be the yielding of a value of 1 with respect to a particular bit position, this would mean that the application of the three hash functions could yield up to three items. A corresponding data structure could have eight columns, with each column n being tasked with keeping count of yieldings of 1 with respect to an nth bit position. As such, where the application of the three hash functions yields a value of 1 with respect to the second, fifth, and eighth bit positions, the following would hold. One item would be the yielding of 1 with respect to the second bit position, and the second column of the data structure would be tasked with keeping track of this item. Another item would be the yielding of a value of 1 with respect to the fifth bit position, and the fifth column of the data structure would be tasked with keeping track of this item. Yet another item would be the yielding of a 1 with respect to the eighth bit position, and the eighth column of the data structure would be tasked with keeping track of this item.

Such employment of multicolumnar data structures in connection with the application of hash functions is discussed in greater detail hereinbelow with respect to FIGS. 7A-7E and FIG. 8.

According to an example, all of the layers of the data structure may be stored in a single memory location (e.g., a single cache). As another example, multiple memory locations (e.g., multiple caches) might be employed in the storage of the layers. Each such memory location (e.g., cache) might hold one or more of the layers of the data structure. With an eye towards FIG. 1 it is noted that, as one illustration the cells of layer L=1 might be stored in a first cache, the cells of L=2 might be stored in a second cache, and the cells of layer L=3 might be stored in a second cache. As another illustration it is noted, again with an eye towards FIG. 1, that the cells of layer L=1 might be stored in a first cache, and both of the cells of layer L=2 and the cells of layer L=3 might be stored in a second cache.

Where multiple storage location (e.g., caches) are, as discussed, employed in storing the layers of the data structure, some or all of the employed caches might differ from one another in properties. For instance, the caches might differ in size and/or speed. According to an example, faster and usually smaller in size memory locations (e.g., caches) might be employed for upper layers of the data structure and/or slower, but bigger caches might be employed for lower layers of the data structure. Such an approach might be employed where the application of the data structure is such that upper layers are accessed more frequently than lower layers.

Figure 2:
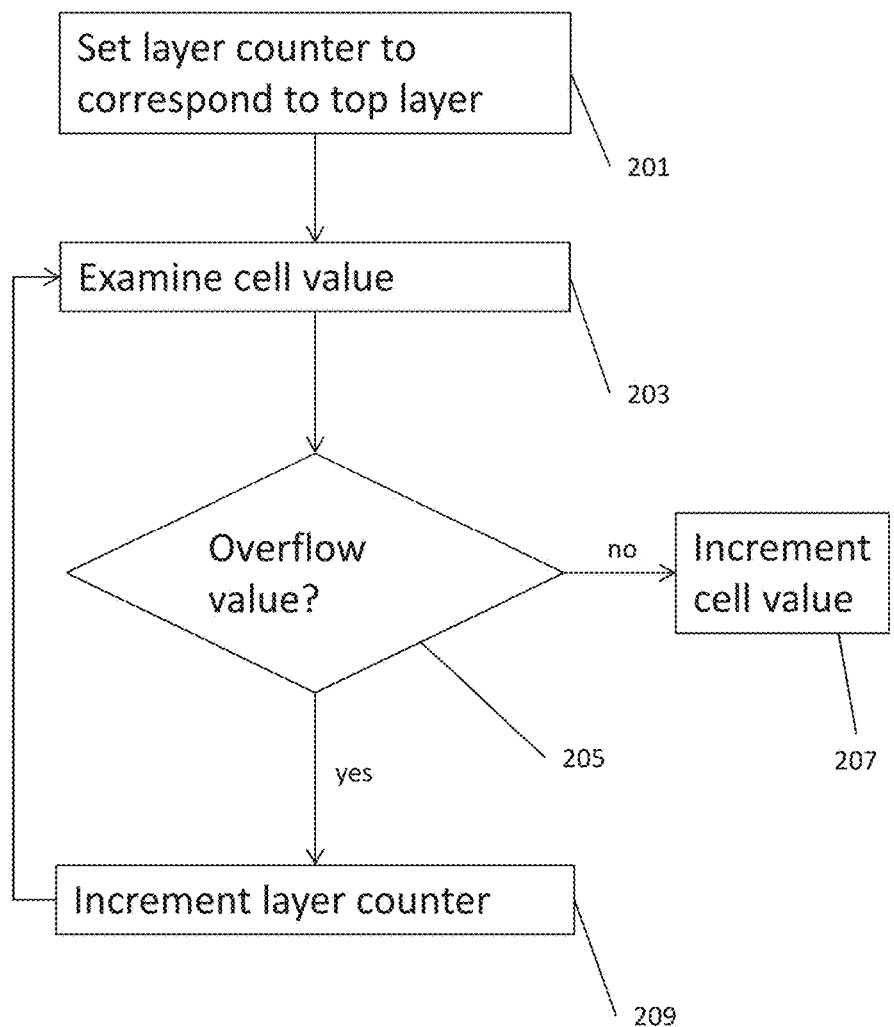
FIG. 2 is a flow diagram illustrating a method of incrementing the count of an item, according to an example.

FIG. 2 illustrates a flow diagram of one example of a method of incrementing the count of an item (e.g., the occurrence of one or more hash functions yielding a value of 1 with respect to a particular bit position). The operations discussed in connection with FIG. 2 may be performed with respect to a column, of a data structure of the sort discussed herein, tasked with keeping count of that item. According to an example, each cell of such a column may have its value set to zero prior to the first count incrementation operation. For instance, if the item being counted were the occurrence of one or more hash functions yielding a value of 1 with respect to a particular bit position, ahead of performing incrementation to make note of the first occurrence of the one or more hash functions so yielding, the value each cell of the relevant column might be set to zero.

The method may be performed by processing logic that comprises hardware (e.g., circuitry, dedicated logic, programmable logic, microcode, etc.), software (such as instructions run on a processing device), or a combination thereof. As one example, the method may be performed by instructions running on a computing device. For instance, the method may be performed by instructions 926 running on computing device 900.

Referring to FIG. 2, at block 201 the processing logic may set a layer counter to correspond to the top layer of the relevant column. For instance, where the top layer of the column corresponds to L=1 the layer counter might be set to 1.

At block 203 the processing logic may examine the value held by the cell of the column layer corresponding to the layer counter. At this juncture, the flow of FIG. 2 has been such that block 201 was performed and then block 203 was performed. As such, for this performance of block 203 the layer counter has been set to correspond to the top layer of the column. This being the case, with this performance of block 203 the processing logic examines the value held by the cell located at the top layer of the column.

At block 205 the processing logic determines whether or not the examined cell value is an overflow value for that cell (e.g., integer 1 (binary 1) in the case of the cell being a one bit cell, or integer 3 (binary 11) in the case of the cell being a two bit cell). In the case where the value of the cell is not an overflow value the processing logic increments, at block 207, the value of the cell. In the case where the value of the cell is an overflow value the processing logic proceeds to block 209 where the layer counter is incremented (e.g., by 1). Flow then returns to block 203, which is now performed in connection with the as-incremented layer counter.

FIGS. 3A-3D illustrate one example of the performance (e.g., in accordance with that which is discussed hereinabove in connection with FIG. 2) of incrementing the count of an item (e.g., the occurrence of one or more hash functions yielding a value of 1 with respect to a particular bit position).

At the start of this example, no incrementation has yet been performed with respect to the item being counted. As such, FIG. 3A shows all cells of the data structure column, corresponding to the item being counted, having been set to zero. For the example of FIGS. 3A-3D, the top layer (301) of this column 1 holds a one bit cell, the middle layer (303) of this column holds a two bit cell, and the lower layer (305) of this column holds a three bit cell.

From the FIG. 3A start point of this example, a first incrementation is performed with respect to the item being counted. it is noted, with an eye towards block 201, that the layer counter has a value such that it points to the top layer cell of the column. It is noted, with an eye towards block 203, that the processing logic considers the value of this cell. As depicted in FIG. 3A, this cell holds a value of zero. As such, with an eye towards block 205 it is noted that the processing logic determines whether or not zero is an overflow value for the cell. As noted, this top layer cell is a one bit cell. As such, the overflow value for this cell is one. The held value of zero is less than the overflow value of one, and as such it is noted, with an eye towards block 205, that the processing logic increments the value of the cell, resulting in that which is depicted in FIG. 3B.

Further according to the example, from here—that is to say the preceding count increment having completed and the column existing as depicted in FIG. 3B—a subsequent count increment is performed with respect to the item. With an eye towards block 201 it is noted that the layer counter once again has a value such that it points to the top layer cell of the column. It is noted, with an eye towards block 203, that the processing logic considers the value of this cell. As depicted in FIG. 3B, this cell holds a value of one. It is noted, with an eye towards block 205, that the processing logic determines whether or not one is an overflow value for the cell. As noted, the overflow value for this cell is one. Therefore, the held value of the cell is the cell's overflow value. This being the case, it is noted, with an eye towards block 209, that the processing logic increments the layer counter, and then returns to block 203.

At block 203 the processing logic considers the value of the cell pointed to by the now-incremented layer counter—the middle layer cell (303) of the column. As depicted in FIG. 3B, this middle layer cell holds a value of zero. At block 205 the processing logic determines whether or not zero is an overflow value for the cell. Being a two bit cell, the overflow value of for this cell is three. As such, the cell does not hold an overflow value. This being the case, with an eye towards block 207 it is noted that the processing logic increments the value of the cell, resulting in that which is depicted in FIG. 3C.

Still further according to the example from here—that is to say the second count increment having completed and the column existing as depicted in FIG. 3C—a further count increment is performed with respect to the item. The processing logic proceeds in a way rather similar to that which was disused in connection with the second count. The processing logic, having appropriately set the layer counter, considers the top layer cell as depicted in FIG. 3C and finds its held value of one to be the cell's overflow value (e.g., for the case of two bits, the overflow value would be integer 3 (binary 11)). This being the case, the processing logic increments the layer counter and then considers the value held by the middle layer cell. The processing logic finds this cell's value to be one rather than the overflow value of three for this two bit cell. This being the case, the processing logic increments the value of the cell resulting in that which is depicted in FIG. 3D.

As discussed, the cells of a given column of a data structure may be interpreted as summing to a value. In the example of FIGS. 3A-3D, a total of three count increments were performed. In keeping with this, summing the cells of the FIG. 3D endpoint of the example—that is to say performing 1+2+0—yields three.

Figure 4:
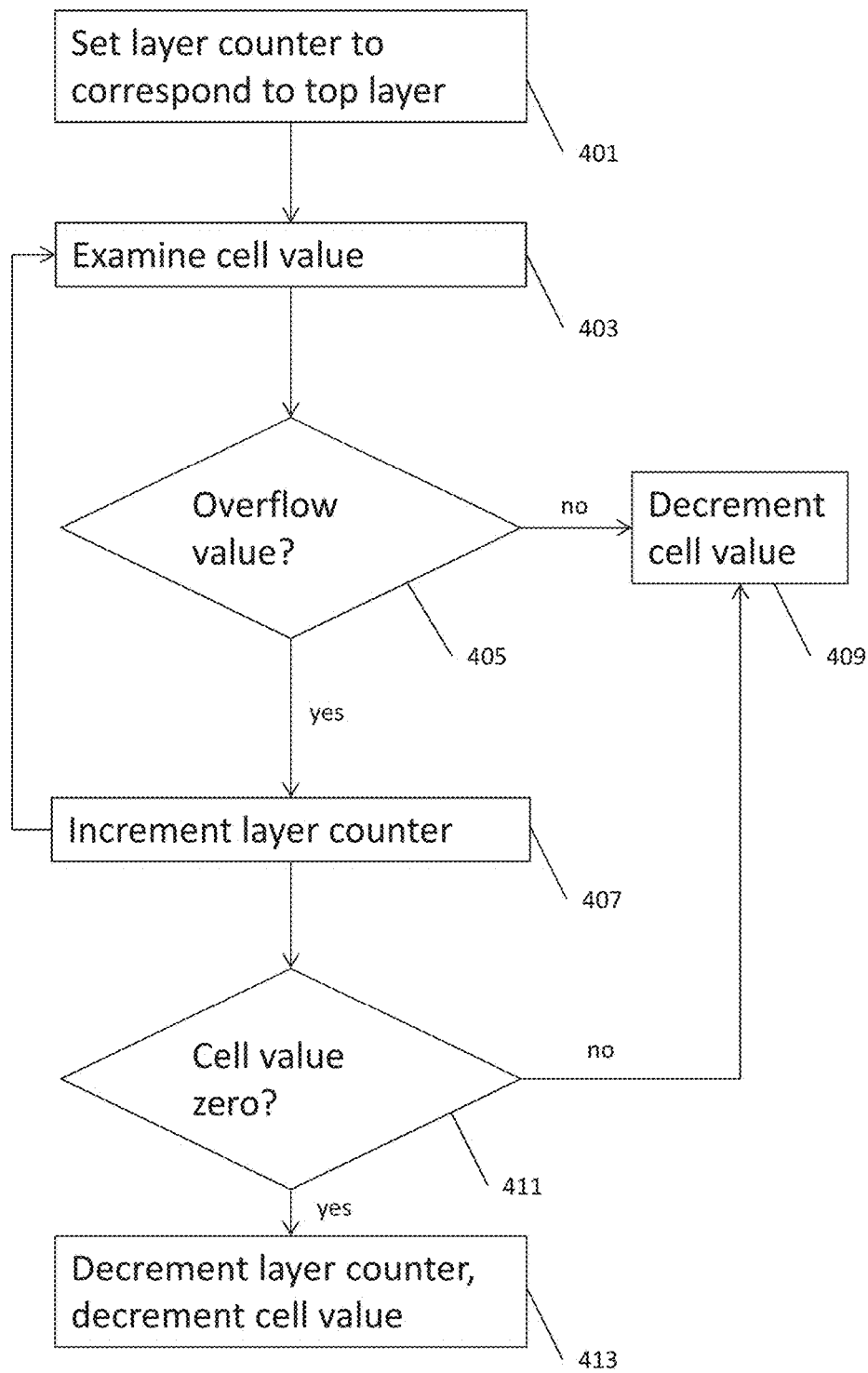
FIG. 4 is a flow diagram illustrating a method of decrementing the count of an item, according to an example.

FIG. 4 illustrates a flow diagram of one example of a method decrementing the count of an item (e.g., the occurrence of one or more hash functions yielding a value of 1 with respect to a particular bit position). The operations discussed in connection with FIG. 2 may be performed with respect to a column, of a data structure of the sort discussed herein, tasked with keeping count of that item. The method may be performed by processing logic that comprises hardware (e.g., circuitry, dedicated logic, programmable logic, microcode, etc.), software (such as instructions run on a processing device), or a combination thereof. As one example, the method may be performed by instructions running on a computing device. For instance, the method may be performed by instructions 926 running on computing device 900.

Referring to FIG. 4, at block 401 the processing logic may act as discussed in connection with block 201 to set a layer counter to correspond to the top layer of the relevant column. For instance, where the top layer of the column corresponds to L=1 the layer counter might be set to 1. At blocks 403 and 405 the processing logic may act as discussed in connection with blocks 203 and 205 to examine the value of the cell pointed to by the layer counter and to determine whether or not the examined cell value is an overflow value for that cell.

Unlike that which was discussed in connection with FIG. 2, in the case where the value of the cell is not an overflow value the processing logic decrements, at block 409, the value of the cell. In the case where the value of the cell is an overflow value the processing logic proceeds to block 407 where the layer counter is incremented (e.g., by 1). After this increment of the layer counter, flow proceeds to block 411.

At block 411 the processing logic determines whether or not the cell pointed to by the just-incremented layer counter is zero. Where the cell value is not zero, flow proceeds to block 409 where the processing logic decrements the value of the cell.

Where the processing logic instead finds the pointed-to cell to hold a value of zero, the processing logic proceeds to block 413. At block 413 the processing logic decrements the layer counter and then decrements the value of the cell pointed to by the as-decremented layer counter.

FIGS. 5A and 5B illustrate one example of the performance (e.g., in accordance with that which is discussed hereinabove in connection with FIG. 4) of decrementing the count of an item (e.g., the occurrence of one or more hash functions yielding a value of 1 with respect to a particular bit position). The example commences as depicted in FIG. 5A, with the data structure column, corresponding to the item being counted, having its top layer (501) holding a value of one, its middle layer (503) holding a value of zero, and its lower layer (505) holding a value of zero. For the example of FIGS. 5A and 5B, the top layer of the column holds a one bit cell, the middle layer of the column holds a two bit cell, and the lower layer of this column holds a three bit cell.

With an eye towards block 401 it is noted that the processing logic sets the layer counter to have a value such that it points to the top layer cell of the column. With an eye towards block 403 it is noted that the processing logic considers the value of this cell. As depicted in FIG. 5A, this cell holds a value of one. With an eye towards block 405 it is noted that the processing logic determines whether or not one is an overflow value for the cell. As noted, the top layer of the data structure has a one bit cell. This being the case, the overflow value for this cell is one. Therefore the cell presently holds its overflow value. In view of this the processing logic proceeds to block 407 where the layer counter is incremented.

It is noted, with an eye towards block 411, that the processing logic determines whether or not the cell pointed to by the just-incremented layer counter is zero. The just-incremented layer counter points to the middle layer cell of the column. As depicted in FIG. 5A, this middle layer cell holds a value of zero. In view of this the processing logic proceeds to block 413. At block 413 the processing logic decrements the layer counter such that the layer counter points once again to the top layer cell of the column. Further at block 413 the processing logic decrements the value of the cell pointed to by the now-decremented counter. Thus, the top layer cell is decremented, resulting in the column having cell values as depicted in FIG. 5B.

As discussed, the cells of a given column of a data structure may be interpreted as summing to a value. In the example of FIGS. 5A and 5B at the start of the example, depicted in FIG. 5A, the cells of the column summed to one (1+0+0=1). Then, at the end of the example, depicted in FIG. 5B, the cells of the column summed to zero (0+0+0=0). As such the end sum of the column is in keeping with that which transpired in connection with the example of FIGS. 5A and 5B—a decrement of the count of the item from a start value of one, resulting in an end value of zero.

FIGS. 6A and 6B depict another example of the performance (e.g., in accordance with that which is discussed hereinabove in connection with FIG. 4) of decrementing the count of an item (e.g., the occurrence of one or more hash functions yielding a value of 1 with respect to a particular bit position). The example commences as depicted in FIG. 6A, with the data structure column, corresponding to the item being counted, having its top layer (601) holding a value of one, its middle layer (603) holding a value of two, and its lower layer (605) holding a value of zero. For the example of FIGS. 6A and 6B, the top layer of the column holds a one bit cell, the middle layer of the column holds a two bit cell, and the lower layer of this column holds a three bit cell.

It is noted, with an eye towards block 401, that the processing logic sets the layer counter to have a value such that it points to the top layer cell of the column. It is noted, with an eye towards block 403, that the processing logic considers the value of this cell. As depicted in FIG. 6A, this cell holds a value of one. It is noted, with an eye towards block 405, that the processing logic determines whether or not one is an overflow value for the cell. As noted, the top layer of the has a one bit cell. This being the case, the overflow value for this cell is one. Therefore the cell presently holds its overflow value. In view of this the processing logic proceeds to block 407 where the layer counter is incremented.

It is noted, with an eye towards block 411, that the processing logic determines whether or not the cell pointed to by the just-incremented layer counter is zero. The just-incremented layer counter points to the middle layer cell of the column. As depicted in FIG. 6A, this middle layer cell holds a value of two. In view of this the processing logic proceeds to block 409 and decrements that value of the cell presently pointed to by the layer counter—the middle layer cell of the column. This results in the column having cell values as depicted in FIG. 6B.

As discussed, the cells of a given column of a data structure may be interpreted as summing to a value. In the example of FIGS. 6A and 6B at the start of the example, depicted in FIG. 6A, the cells of the column summed to three (1+2+0=3). Then, at the end of the example, depicted in FIG. 6B, the cells of the column summed to two (1+1+0=2). As such the end sum of the column is in keeping with that which transpired in connection with the example of FIGS. 6A and 6B—a decrement of the count of the item from a start value of three, resulting in an end value of two.

As noted hereinabove, a data structure of the sort discussed herein may be employable in maintaining counts of items, for instance with each column of the data structure being tasked with keeping count of a particular item. Discussed in connection with FIGS. 7A-7E is one example of maintaining, with respect to each of multiple items, count of that item. In particular, maintained, with respect to each of multiple bit positions, is count of one or more hash functions yielding a value of 1 with respect to that bit position. Discussed in connection with this example are both incrementory count (e.g., in accordance with that which is discussed hereinabove in connection with FIG. 2) and decrementory count (e.g., in accordance with that which is discussed hereinabove in connection with FIG. 4).

At the start of this example, no count operations have yet been performed with respect to the items being counted. As such FIG. 7A shows all cells of all columns of the data structure having been set to zero. For the example of FIGS. 7A-7E m=8 and therefore the data structure has eight columns of cells. Moreover, L=3 and therefore the data structure has three layers of cells. Further for this example the cells of the top layer (701) are one bit cells, the cells of the middle layer (703) are two bit cells, and the cells of the bottom layer (705) are three bit cells.

Further for this example, k hash functions are employed with k being set to 3. The application of k hash functions to an input yields the identification of a value of 1 with respect to j<=k bit positions amongst the at-hand m bit positions. As such, the application of these k=3 hash functions to an input yields the identification of a value of 1 with respect to j<=3 bit positions amongst m=8 bit positions. As an example, the incrementory count and/or the decrementory count operations discussed hereinbelow may be performed such that the hashes may be computed once, and proceeding to lower data structure levels may not involve these hashes being computed again. For this example, the mth column of the data structure is tasked with keeping count of instances of the j<=3 hash functions yielding a 1 with respect to the mth bit position (e.g., the first column of the data structure is tasked with keeping count of instances of the hash functions yielding a 1 with respect to the first bit position, and the sixth column of the data structure is tasked with keeping count of instances of the hash functions yielding a 1 with respect to the sixth bit position).

Firstly in connection with the example, incrementory count is performed with respect to the application of the three hash functions to an input α. The application of the three hash functions to α yields a 1 with respect to the second, fifth, and eighth bit positions. As such incrementory count in accordance with that which is discussed hereinabove in connection with FIG. 2 is performed with respect to the second, fifth, and eighth columns of the data structure as depicted in FIG. 7A. In agreement with that which is discussed in connection with FIG. 2 hereinabove, the result of this incrementory count is as depicted in FIG. 7B.

Also in connection with the example, a further incrementory count is performed with respect to the three hash functions, with the three hash functions now being applied to an input δ. The application of the three hash functions to δ yields a 1 with respect to the third, fifth, and seventh bit positions. As such incrementory count in accordance with that which is discussed hereinabove in connection with FIG. 2 is performed with respect to the third, fifth, and seventh columns of the data structure as depicted in FIG. 7B (i.e., the data structure as it stands subsequent to the performance the discussed incrementory count with respect to α). In agreement with that which is discussed in connection with FIG. 2 hereinabove, the result of this incrementory count for δ is as depicted in FIG. 7C.

Next in connection with the example yet another incrementory count is performed with respect to the three hash functions, with the three hash functions now being applied to an input β. The application of the three hash functions to β yields a 1 with respect to the first, second, and fifth bit positions. As such incrementory count in accordance with that which is discussed hereinabove in connection with FIG. 2 is performed with respect to the first, second, and fifth columns of the data structure as depicted in FIG. 7C (i.e., the data structure as it stands subsequent to the performance the discussed incrementory count with respect to δ). In agreement with that which is discussed in connection with FIG. 2 hereinabove, the result of this incrementory count for β is as depicted in FIG. 7D.

Now in connection with the example, a decrementory count is performed with respect to the application of the three hash functions to the noted input δ. As discussed, the application of the three hash functions to δ yields a 1 with respect to the third, fifth, and seventh bit positions.

According to an example, the result of a given application of at-hand hashes may be stored (e.g., for a period of time specified in a configuration operation). As such, for instance, the result of the application of the three hash functions to δ which was performed in connection with the above-incrementory count with respect to δ might have been stored. Under such circumstance, the now-discussed decrementory count with respect to δ might not involve a reapplication of the three hash functions to δ, but rather a retrieval of the previously stored result. As another example (e.g., where the hash relevant result had not been stored, and/or where the relevant hash result had been stored but a specified period for keeping the result had expired) the relevant hash might be applied anew.

In light of the application of the three hash functions to δ yielding a 1 with respect to the third, fifth, and seventh bit positions, decrementory count in accordance with that which is discussed hereinabove in connection with FIG. 4 is performed with respect to the third, fifth, and seventh columns of the data structure as depicted in FIG. 7D (i.e., the data structure as it stands subsequent to the performance the discussed incrementory count with respect to β). In agreement with that which is discussed in connection with FIG. 4 hereinabove, the result of this decrementory count is as depicted in FIG. 7E.

Figure 8:
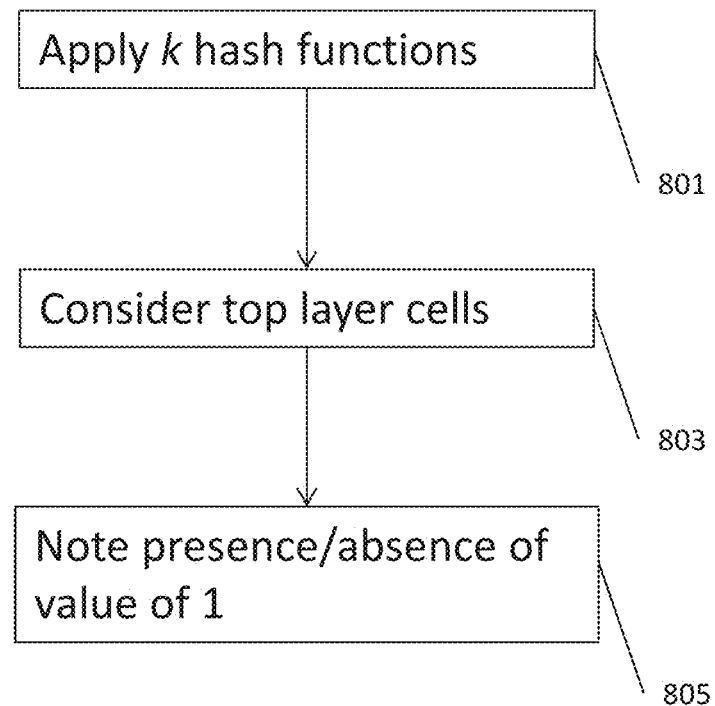
FIG. 8 is a flow diagram illustrating a method of lookup, according to an example.

FIG. 8 illustrates a flow diagram of one example of a method of lookup. The method may be performed by processing logic that comprises hardware (e.g., circuitry, dedicated logic, programmable logic, microcode, etc.), software (such as instructions run on a processing device), or a combination thereof. As one example, the method may be performed by instructions running on a computing device. For instance, the method may be performed by instructions 926 running on computing device 900. The lookup will approach the data structure to which it is applied under a scenario wherein it is taken to be the case that the processing logic performing the lookup operation has no record of count operations beyond that which can be construed from the considered data structure.

Referring to FIG. 8, at block 801 the processing logic may apply k hash functions to the input with respect to which lookup is being performed. At block 803 the processing logic may, for each mth bit position for which the hash functions yield a 1, consider the mth column cell of the top layer of the data structure under consideration.

At block 805, the processing logic may note, with respect to each such considered mth column top layer cell, the presence or absence of a value of 1. In the case where all such top layer cells possess a value of 1, the processing logic may conclude that there possibly has been performance of an incrementory count with respect to the input. In the case where one or more of such top layer cells possess a value of zero, the processing logic concludes that there has not been performance of an incrementory count with respect to the input.

The noted result of the processing logic determining that there possibly has been performance of incrementory count with respect to the input might, for instance, be viewed as acting from the vantage point that a given presence of a 1 in a considered cell might have been arisen due to the performance of incrementory count with respect to the at-hand input, but might also exist there for another reason. For instance, considering the above-discussed hashes performed with respect to a and β, it is seen that for each of α and β the hashes yield a 1 with respect to the second bit position. As such, for instance, the presence of a value of 1 in the corresponding second bit position of the top layer of the might have arisen due to either of α and β, or perhaps for another reason. As such, a lookup considering, say, α might act from the vantage point that it cannot safely conclude, for example, that the value of 1 in the cell arose due to an incrementory count performed with respect to α.

It is noted that the processing logic concluding that there possibly has been performance of the at-hand incrementory count might, perhaps, be viewed indicting that there has been performance of the at-hand incrementory count, but with the proviso that such affirmative result may be a false positive.

The noted result of the processing logic determining that there has not been performance of incrementory count with respect to the input might, for instance, be viewed as acting from the vantage point that the presence of a zero in a considered cell makes it clear that incrementory count has not been performed with respect to the input. To wit, incrementory count with respect to the input could not have been performed in a way that the considered cell would not have had its value set to one. For instance, recall that the above-discussed hashes performed with respect to αyielded a 1 with respect to the second, fifth, and eighth bit positions. As such, even if no other performed incrementory count called for a 1 for these positions, the fact that the hashes upon α did so would have ensured that the second, fifth, and eighth column top row cells of the data would not have retained zeroes. As such, the presence of a zero in the second, fifth, or eighth column top row cell would indicate that incrementory count had not been performed with respect to α.

As noted, lookup involves consideration of the top layer of the of the data structure. According to an example, other layers of the data structure are not considered when performing lookup. Such an approach might, for instance, be adopted from the vantage point that no layers beyond the top layer of a data structure would need to be considered in order to yield the above-discussed result that there possibly has been incrementory count performance, or in order to yield that above-discussed result that there has not been incrementory count performance.

An example of the performance (e.g., in accordance with that which is discussed hereinabove in connection with FIG. 8) of lookup will now be discussed in connection with FIG. 7D. As such, considered will be the data structure discussed in connection with FIGS. 7A-7E subsequent to the discussed incrementory count performed with respect to β, but prior to the discussed decrementory count performed with respect to δ. Moreover, as noted lookup approaches the data structure to which it is applied under a scenario wherein it is taken to be the case that the processing logic performing the lookup operation has no record of count operations beyond that which can be construed from the considered data structure.

Firstly in connection with the example, lookup will be performed with respect to α. It is noted, with an eye towards block 801, that as discussed above the application of the three hash functions to α yields a 1 with respect to the second, fifth, and eighth bit positions. With an eye towards blocks 803 and 805 it is noted that the processing logic considers, for each of the second, fifth, and eight column top layer cells of the data structure of FIG. 7D, the presence or absence of a value of 1. As depicted in FIG. 7D, each of these cells contains a value of 1. As such, the processing logic concludes that there possibly has been performance of an incrementory count with respect to α.

Secondly in connection with the example, lookup will be performed with respect to an input λ. Suppose, with an eye towards block 801, that the application of the three hash functions to λ yields a 1 with respect to the first, second, and sixth bit positions. With an eye towards blocks 803 and 805 it is noted that the processing logic considers, for each of the first, second, and sixth column top layer cells of the data structure of FIG. 7D, the presence or absence of a value of 1. As depicted in FIG. 7D the first and second column top layer cells each contain a value of 1 but the sixth column top layer cell contains a value of zero. As such, the processing logic concludes that there has not been performance of an incrementory count with respect to λ.

As discussed in connection with the example of FIG. 2 hereinabove, incrementing the count of an item (e.g., the occurrence of one or more hash functions yielding a value of 1 with respect to a particular bit position) may involve the progression to lower layers of a data structure.

According to one example, the number of layers possessed by a data structure may be set prior to performing count operations with respect to that data structure, and with no layers being subsequently added. As an example, the number of layers and/or the bit size of the cells of the lowest layer might be selected with an with an eye towards avoiding overflow with respect to the lowest layer. For instance, 64 bit cells might be employed for the lowest layer Under such a scenario, in the case where incrementing the count of an item proceeds down to the bottom layer of the data structure and then finds an overflow condition with respect to that layer, the processing logic may not successfully complete the at-hand count increment with respect to the item (e.g., with the processing logic perhaps logging an error to a storage location and/or displaying an error message to a user via a Graphical User Interface (GUI) or other interface).

According to a second example, one or more layers possessed by a data structure may be set prior to performing count operations with respect to that data structure, but then one or more additional layers may subsequently be added on an as-needed basis. Under such a scenario, in the case where incrementing the count of an item proceeds down to the bottom layer of the data structure and then finds an overflow condition with respect to that layer, the processing logic may, for instance, add one or more layers until at least one layer for which an overflow condition does not arise is added. The processing logic may then achieve the at-hand count increment with respect to the item by performing cell value increment with respect to the first added layer for which there is no overflow.

The approach of this second example might be viewed as having advantage over the approach of the first example by potentially leading to memory savings. The approach of this first example might be viewed as having advantage over the approach of the second example by potentially leading to time and/or processing savings (e.g., from the vantage point that adding data structure layers on an as-needed basis might result in either or both of slower count operations and/or greater processor use in count operations).

According to an example, operations of the sort discussed herein may be employed so as to implement a filter. Insertion of an entity to the filter may be performed, for instance, along the lines of the incrementory count discussed in connection with FIGS. 7B-7D. An entity for which insertion is so performed might be considered to belong to a set (e.g., with the set being given the designation S). Removal of an entity from the filter may be performed, for instance, along the lines of the decrementory count discussed in connection with FIG. 7E. An entity for which deletion is so performed might be considered to be one no longer belong to a set. Lookup of an entity with respect to the filter may be performed, for instance, along the lines of that which is discussed in the lookup operations discussed in connection with FIG. 7D. Such lookup of an entity might be considered to be a lookup as to whether or not the entity is in the set.

As one example, such a filter may be employed in connection with a firewall. The firewall might act to insert new flows into the filter. The firewall may act to remove flows from the filter (e.g., flows which have expired). The firewall may act to perform flow lookups. As one example, the firewall may perform certain intensive (e.g., time, processor, and/or memory intensive) operations with respect to flows and then store the results of those operations.

The lookup might serve to allow the firewall to realize that a given flow possibly has been seen before. The firewall, considering that the flow possibly has been seen before, may attempt to retrieve a previously-stored corresponding result. Bearing in mind the potential a false positive, the attempt might fail.

The lookup might serve to allow the firewall to realize that a given flow has not been seen before. In view of this the firewall might opt, for instance, to perform the intensive operations and then save the result for possible use later.

As another example, such a filter may be alternately or additionally employed in connection with a firewall where it is desired to determine whether or not an incoming flow is a member of a set for which certain filtering rules apply.

According to an example lookup may only involve the consideration of the top layer of a data structure and not other layers. Moreover, the top layer of the data structure may be stored in a fast, small, and/or more expensive cache while other layers may be stored in one or more other caches which may be slower, larger, and/or less expensive than the top layer cache. As such, lookups, because they only access the top layer, may enjoy the speed of the corresponding fast cache. The use of slower, larger, and/or less expensive for the other layers may be facilitated by the fact that lookups will not need to access these layers. According to one or more example scenarios, lookups may be performed more frequently than other operations involving the data structure. As an example, faster caches may be size-constrained. As such, a small, fast cache might be employable in view of only the top layer of the data structure—which might, for instance, possess only one bit cells—needing to be stored there. In contrast, such a fast, small cache might not be employable had it been called for that a greater portion of the data structure be stored there.

Moreover, bearing in mind that which is discussed above with respect to incrementory count and decrementory count, the frequency with which lower data structure layers (e.g., layers beneath the first layer) are accessed may decrease as the L value increases. This may serve to facilitate faster, smaller, and/or more expensive caches being used for higher layers (e.g., with one or more of speed increasing, size decreasing, and/or cost increasing as the L value decreases). Moreover, with reference to that which is discussed above the number of bits per cell may increase as the value L increases. As such higher, smaller, layers may be able to enjoy smaller, faster caches which might have been unavailable in the case where greater portions of the data structure were to have been stored in them.

As noted, the number of bits per cell may increase as one proceeds to lower layers of the data structure (e.g., the number of bits employed for the cells of a row may double as one proceeds to lower layers). This property might, from one vantage point, be viewed as a growth in in number of bits which lends a fractal-like nature to the data structure.

From one vantage point, the above-discussed operations (e.g., incrementory count and decrementory count) may be viewed as operating in a regular, consistent way with respect to varying values of L, and without there being call that the processing logic be aware in advance of the total number of layers in the data structure or the total size of the data structure. Such might be viewed lending a cache-obliviousness to these operations.

Figure 9:
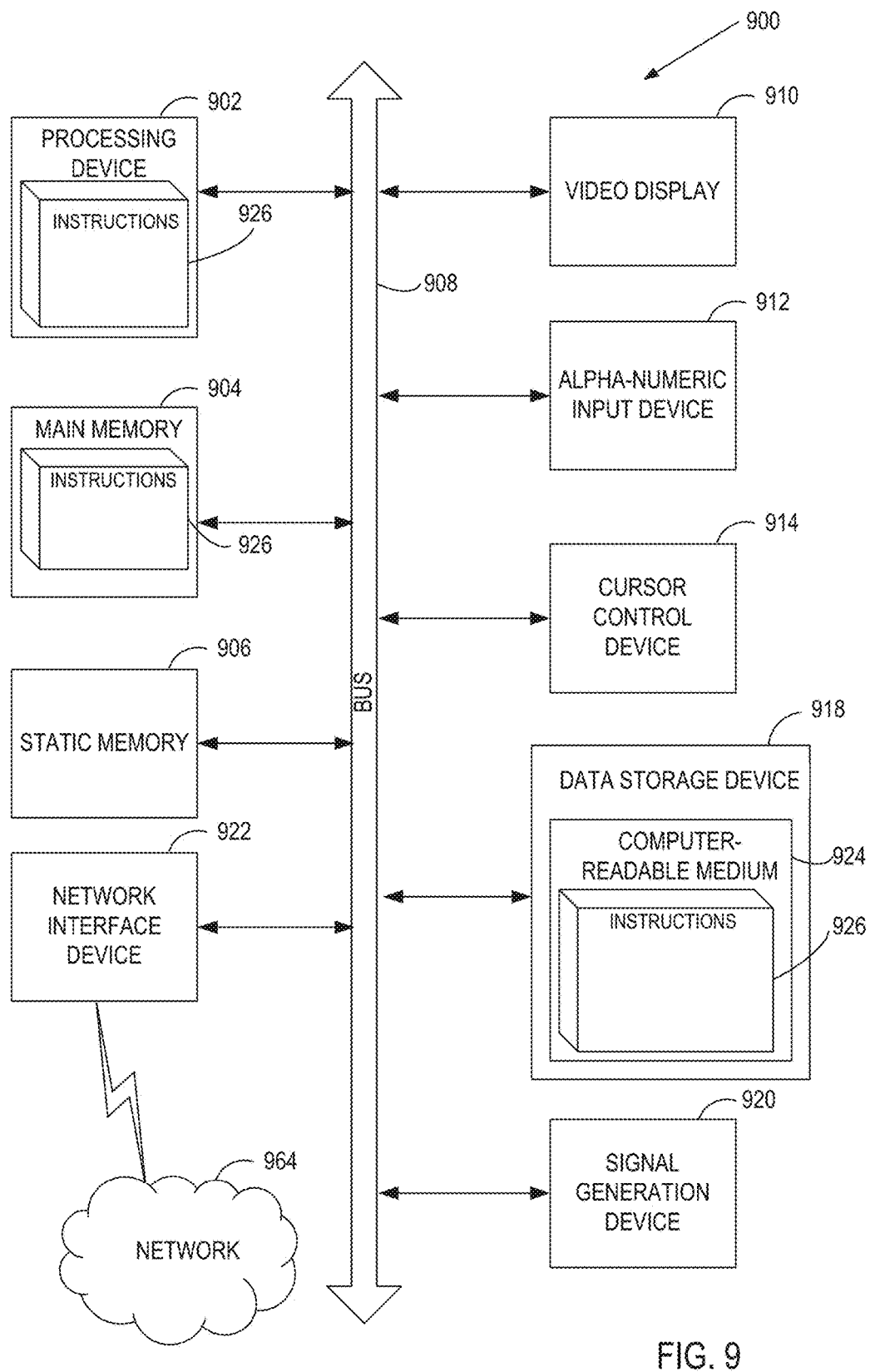
FIG. 9 is a diagrammatic representation of a machine, according to an example.

FIG. 9 illustrates a diagrammatic representation of a machine in the example form of a computing device 900 within which a set of instructions, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory (e.g., a data storage device 918), which communicate with each other via a bus 908.

Processing device 902 represents one or more general-purpose processors such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the processing logic (instructions 926) for performing the operations and steps discussed herein.

The computing device 900 may further include a network interface device 922. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 918 may include a machine-readable storage medium (or more specifically a computer-readable storage medium) 924 on which is stored one or more sets of instructions 926 embodying any one or more of the methodologies or functions described herein. The instructions 926 may also reside, completely or at least partially, within the main memory 904, within the static memory 906 and/or within the processing device 902 during execution thereof by the computer system 900, the main memory 904, static memory 906 and the processing device 902 also constituting computer-readable storage media.

While the computer-readable storage medium 924 is shown in an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an inter-mittent and/or alternating manner. It is to be understood that the above description is intended to be illustrative, and not restrictive. Many other embodiments will be apparent upon reading and understanding the above description. Although embodiments of the present invention have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
identifying, by a processing device, a data structure comprising a first layer that is stored in a first cache and a second layer that is stored in a second cache, wherein the first cache differs from the second cache with respect to one or more of speed or size;
updating, by the processing device, the data structure in response to a first memory lookup, the updating comprising:
setting a counter to point to the first layer of the data structure;
determining that the first layer of the data structure contains an overflowing cell;
incrementing the counter to point to the second layer of the data structure;
determining that the second layer of the data structure contains a non-overflowing cell;
incrementing a value of the non-overflowing cell by an integer corresponding to an overflow value of the non-overflowing cell, wherein the integer equals a count of hash functions that yield a value of one at a particular bit position;
incrementing the counter to point to a third layer of the data structure;
determining that the third layer of the data structure holds a value of zero; and
decrementing the counter to point to the second layer of the data structure; and
processing a second memory lookup that accesses a top layer of the data structure and accesses no other layer of the data structure in view of the updated data structure.

2. The method of claim 1,
wherein the first layer comprises one or more cells of a first size,
wherein the second layer comprises one or more cells of a second size, and
wherein the second size is larger than the first size.

3. The method of claim 1,
wherein the data structure comprises two or more columns,
wherein a first of the two or more columns is tasked with keeping count of a first item, and
wherein a second of the two or more columns is tasked with keeping count of a second item.

4. The method of claim 1,
wherein the data structure corresponds to a filter, and
wherein the incrementing of the value of the non-overflowing cell corresponds to an insertion of an entity into the filter.

5. An apparatus, comprising:
a memory; and
a processing device, operatively coupled to the memory, to:
identify a data structure, the data structure comprising a first layer that is stored in a first cache and a second layer that is stored in a second cache, wherein the first cache differs from the second cache with respect to one or more of speed or size;
update the data structure in response to a first memory lookup, wherein to update the data structure, the processing device is to:
set a counter to point to the first layer of the data structure;
determine that the first layer of the data structure contains an overflowing cell;
increment the counter to point to the second layer of the data structure;
determine that the second layer of the data structure contains a non-overflowing cell;
increment a value of the non-overflowing cell by an integer corresponding to an overflow value of the non-overflowing cell, wherein the integer equals a count of hash functions that yield a value of one at a particular bit position;
increment the counter to point to a third layer of the data structure;
determine that the third layer of the data structure holds a value of zero; and
decrement the counter to point to the second layer of the data structure; and
process a second memory lookup that accesses a top layer of the data structure and accesses no other layer of the data structure in view of the updated data structure.

6. The apparatus of claim 5,
wherein the first layer comprises one or more cells of a first size,
wherein the second layer comprises one or more cells of a second size, and
wherein the second size is larger than the first size.

7. The apparatus of claim 5,
wherein the data structure comprises two or more columns,
wherein a first of the two or more columns is tasked with keeping count of a first item, and
wherein a second of the two or more columns is tasked with keeping count of a second item.

8. The apparatus of claim 5,
wherein the data structure corresponds to a filter, and
wherein the increment of the value of the non-overflowing cell corresponds to an insertion of an entity into the filter.

9. A non-transitory machine-readable storage medium storing instructions which, when executed, cause a processing device to:
identify, by the processing device, a data structure comprising a first layer that is stored in a first cache and a second layer that is stored in a second cache, wherein the first cache differs from the second cache with respect to one or more of speed or size;
update, by the processing device, the data structure in response to a first memory lookup, wherein to update the data structure, the processing device is to:
set a counter to point to the first layer of the data structure;
determine that the first layer of the data structure contains an overflowing cell;
increment the counter to point to the second layer of the data structure;
determine that the second layer of the data structure contains a non- overflowing cell;
increment a value of the non-overflowing cell by an integer corresponding to an overflow value of the non-overflowing cell, wherein the integer equals a count of hash functions that yield a value of one at a particular bit position;

increment the counter to point to a third layer of the data structure;

determine that the third layer of the data structure holds a value of zero; and decrement the counter to point to the second layer of the data structure; and process a second memory lookup that accesses a top layer of the data structure and accesses no other layer of the data structure in view of the updated data structure.

10. The non-transitory machine-readable storage medium of claim 9, wherein the first layer comprises one or more cells of a first size, wherein the second layer comprises one or more cells of a second size, and wherein the second size is larger than the first size.

11. The non-transitory machine-readable storage medium of claim 9, wherein the data structure comprises two or more columns, wherein a first of the two or more columns is tasked with keeping count of a first item, and wherein a second of the two or more columns is tasked with keeping count of a second item.

12. The non-transitory machine-readable storage medium of claim 9, wherein the data structure corresponds to a filter, and wherein the increment of the value of the non-overflowing cell corresponds to an insertion of an entity into the filter.

* * * * *